(12) United States Patent
Prielinger et al.

(10) Patent No.: US 8,083,018 B2
(45) Date of Patent: Dec. 27, 2011

(54) REAR SWINGING FORK FOR A MOTORCYCLE

(75) Inventors: Robert Prielinger, Vorchdorf (AT); Olaf Seger, Laufen (DE); Andreas Wimmer, Burgkirchen (AT)

(73) Assignee: KTM Sportmotorcycle AG, Mattighofen (AT)

( * ) Notice: Subject to any disclaimer, the term of this patent is extended or adjusted under 35 U.S.C. 154(b) by 480 days.

(21) Appl. No.: 11/904,206

(22) Filed: Sep. 26, 2007

(65) Prior Publication Data
US 2008/0073140 A1 Mar. 27, 2008

(30) Foreign Application Priority Data
Sep. 27, 2006 (DE) .................. 10 2006 045 625

(51) Int. Cl.
*B62K 19/12* (2006.01)
*B62K 25/10* (2006.01)
(52) U.S. Cl. ...................... 180/227; 280/284
(58) Field of Classification Search .......... 180/227, 180/219; 280/284, 288, 285, 288.3, 281.1
See application file for complete search history.

(56) References Cited

U.S. PATENT DOCUMENTS

| 2003/0010557 A1 | 1/2003 | Miyashiro | |
| 2004/0154852 A1* | 8/2004 | Miyashiro et al. | 180/219 |
| 2005/0206122 A1* | 9/2005 | Ichihara et al. | 280/284 |

FOREIGN PATENT DOCUMENTS

| DE | 2006-629354 | * | 8/2006 |
| EP | 0 295 799 A2 | | 12/1988 |
| JP | 61-215188 A | | 9/1986 |
| JP | 61-215189 A | | 9/1986 |
| JP | 62-122887 A | | 6/1987 |
| JP | 02-193791 A | | 7/1990 |
| JP | 2007-118951 | * | 5/2007 |

* cited by examiner

*Primary Examiner* — Anne Marie M Boehler
(74) *Attorney, Agent, or Firm* — Rod D. Baker

(57) ABSTRACT

Provided is a rear swinging fork (1) for a motorcycle, die-cast in one piece and featuring two longitudinal extending supporting arms (2, 3) each having three supporting walls (6, 7, 8), and a transverse cross member (4) connecting the supporting arms (2, 3). Each of the supporting arms (2, 3) has a mount for pivotal location of the rear swinging fork (1) on a motorcycle frame, and includes in the region of the ends of the supporting arms, opposite the mounts (5), a wheel mount (11) for the rear wheel of the motorcycle. The portion of the fork between the cross member (4) and the mounts (5) is openly configured, and the supporting arms (2, 3) feature in a section transverse to the longitudinal direction of the rear swinging fork (1) an upper supporting wall (6), a lower supporting wall (7), and an inboard supporting wall (8) connecting the upper (6) and lower supporting wall (7) and located in the longitudinal direction of the rear swinging fork (1), with a cavity (16) formed between the supporting walls.

21 Claims, 5 Drawing Sheets

REAR SWINGING FORK FOR A MOTORCYCLE

CROSS-REFERENCE TO RELATED APPLICATIONS

This application claims priority to German Patent Application No. DE 10 2006 045 625.4, filed on Sep. 27, 2006, the entirety of which is incorporated herein by reference.

BACKGROUND OF THE INVENTION

1. Field of the Invention

The present invention relates to motorcycle frames, particularly rear forks for such frames, and specifically to a rear swinging fork for a motorcycle, fabricated as a one-piece die cast component and featuring two longitudinal supporting arms each with three supporting walls and a transverse cross member connecting the supporting arms.

2. Background Art

The main function of the rear swinging fork is to connect the rear wheel of the motorcycle to the frame and to direct spring damper forces into the frame.

In the art, a distinction is made between so-called single and double swing arm types, depending on the number of swing arms of the rear swinging fork supporting the rear wheel. Negotiating a bumpy road surface subjects the rear swinging fork to heavy flexural loading, due to the vertical forces stressing the rear swinging fork when the wheel hits the road again after leaping. The bending moment on the fork is particularly high in the region of the strut pivot link. The rear wheel of the motorcycle builds up side forces which stress the fork with forces on cornering, resulting in the footprint of the tire being displaced to a torsional moment stressing the rear swinging fork. In other words, the rear swinging fork is a highly stressed component of the motorcycle, and although needing to be engineered to be stiff, since as a vertically oscillating mass it influences the center of gravity location of the motorcycle and thus the response, it nevertheless must be a lightweight component.

Rear swinging forks for motorcycles having twin supporting arms are already known in a wealth of different variants. Thus, for example, they are known as welded structures with steel tubes, but also as so-called built-up forks assembled from a plurality of components produced by casting, forging, extrusion or made of sheet metal. Also known are rear swinging forks cast in one piece, involving hitherto mainly sand castings but also permanent moldings.

EP 0295 799 B1 discloses a rear swinging fork as a die-cast aluminum component. This known rear swinging fork has, extending in its longitudinal direction, twin supporting arms and twin cross members connecting the supporting arms in the region of a strut mount of the motorcycle and in the region of both mounts for pivotally mounting the rear swinging fork to the frame. In other words, there are two fulcrum mounts of the fork. The two supporting arms of this known type of rear swinging fork are each engineered so that a cross-sectional view through the two supporting arms has the shape of an inverted "U." Stated differently, this device has two side supporting walls which, when the known rear swinging fork is mounted in the frame, are downswept in the direction of a mount at rear swinging fork for strut; it also has an upper supporting wall connecting the two side supporting walls and arranged opposite the strut mount, resulting in a configuration of side supporting walls and upper supporting wall each for each supporting arm in the form of an inverted U.

Situated within the cavity between the two side supporting walls and the upper supporting wall of this known rear swinging fork is a stiffening rib. The rib is oriented in the longitudinal direction of the rear swinging fork from the two fulcrums of the fork mount of the cross member connecting each of the supporting arms up to the rear wheel mount of the motorcycle. The section of this known rear swinging fork between the cross member in the region of the two fulcrums of the fork mount of the supporting arms and the further cross member is engineered with an opening forming an inherently closed space between the further cross member (located displaced to the rear in the longitudinal direction of the rear swinging fork extending from the fork mount fulcrum in the direction of the wheel mount) and the cross member between the two fork mount fulcrums.

When a motorcycle featuring this known rear swinging fork is exposed to highly dynamic performance, such as negotiating bumpy road surfaces or rough terrain with subsequent landing impact of the motorcycle—as with off-road competition models or also other dynamic models—or when, for instance, negotiating bumpy roads with a motorcycle equipped with such known rear swinging forks, there results in the rear swinging fork heavy flexural stresses. Jouncing of the strut or spring damper subjects this known fork to high tensile stress in the region of the underside of the supporting arms facing the road surface to high tensile stress. Consequently, the fork is required to absorb maximum tensile stress at the cross-section of the supporting arms having a minimal material wall thickness. This poses the risk of stress cracks occurring particularly in the lower region of the supporting arms, ultimately resulting in fracture of the rear swinging fork.

Against the foregoing background, the present invention was developed with the object of sophisticating the rear swinging fork so that the cited disadvantage of stress cracking, in the region of portions of the rear swinging fork exposed to high tensile stress and the risk of buckling the upper supporting wall of the supporting arms, is avoided whilst defining a configuration of the rear swinging fork which combines torsional rigidity with low weight.

SUMMARY OF THE INVENTION

The present disclosure defines a rear swinging fork for a motorcycle, die-cast in one piece and featuring two longitudinal extending supporting arms. Each supporting arm has three supporting walls. There is a transverse cross member connecting the supporting arms, each of the supporting arms having a mount for pivotal location on the rear swinging fork on a motorcycle frame. In the region of the ends of the supporting arms, opposite the pivot mounts, a there are provided wheel mounts for the rear wheel of the motorcycle. The portions of the support arms between the cross member and the mounts has an open configuration; the supporting arms feature, in a section transverse to the longitudinal direction of the rear swinging fork, an upper supporting wall, and a lower supporting wall, and an inboard supporting wall connecting the upper and lower supporting wall in the longitudinal direction of the rear swinging fork. A cavity is formed between the supporting walls.

There is disclosed a rear swinging fork which can be die-cast in one piece, and which is engineered open in the portion between the cross member and the mounts on the supporting arms for mounting the rear swinging fork on the motorcycle frame; in other words, the fulcrums for mounting the fork thus feature no cross member between the mounts, as is provided for in the known rear swinging fork. There results a significant savings in material and weight. Despite this, however, the rear swinging fork in accordance with this disclosure still features high rigidity to flexural, side and torsional stresses due to the inventive configuration. Each supporting arm now has three supporting walls, namely an upper supporting wall, a lower supporting wall, and an inboard supporting wall in the longitudinal direction of the rear swinging fork, that latter of which connects the upper and lower supporting walls. The lower supporting wall (facing the road surface when the rear swinging fork is installed in accordance with the invention on the motorcycle frame) extends transverse to the longitudinal direction of the rear swinging fork, and thus absorbs the side forces and tensile forces in highly dynamic action of the motorcycle. This is in accordance with the background explained above, i.e. in a region in which the known rear swinging fork as described above tends to stress crack and thus to fatigue fracture. In addition, the bending stresses instigated by the vertical forces are now absorbed by the inboard supporting wall forming a central supporting member connected to the upper and lower supporting wall.

The upper and lower supporting walls in addition absorb the side forces to provide high lateral rigidity of the rear swinging fork, thus preventing side buckling of the central supporting member or of the inboard supporting wall. In this arrangement, the inboard supporting wall is connected to the upper and lower supporting wall so that the supporting walls form between them an open cavity, saving material and therefore reducing the weight of the rear swinging fork.

The supporting walls of the supporting arms in the disclosed arrangement can be interconnected and each configured such that they feature or define a C-shaped cross-section. In other words, as viewed in the longitudinal direction of the rear swinging fork, the cavity is oriented to open toward the side of an imaginary longitudinal center plane of the rear swinging fork and not, as in the known rear swinging fork, oriented in the direction toward the road surface when the rear swinging fork is mounted on the motorcycle as intended. Rather, the supporting arm cavities of the disclosed apparatus extend sideways from the longitudinal center plane of the rear swinging fork.

When the inboard supporting wall is viewed by itself, i.e. without the upper and lower supporting wall connected in one piece thereto, this inboard supporting wall has in a section transverse to the longitudinal direction of the supporting arm a "saddleback roof" type configuration. The inboard supporting wall features a predefined wall thickness in forming an inboard supporting wall surface and an outboard supporting wall surface. In transverse section, the inboard supporting wall forms or subtends an internal angle in the range of from approximately 160 degrees to approximately 180 degrees. Thus, depending on the collective loading acting on the rear swinging fork in accordance herewith, an inboard supporting wall is provided which, although having a saddleback roof type configuration cross-sectionally, now approximates a near plane supporting wall, with an angle increasing in the direction of 180 degrees. Due to its configuration, the inboard supporting wall ensures high longitudinal rigidity of the rear swinging fork, it now being capable of handling high vertical forces introduced via the rear wheel into the rear swinging fork and the resulting bending stress loads.

For this purpose, it is provided for in a further aspect of the disclosed apparatus that the wall thickness of the inboard supporting wall increases from an initial wall thickness substantially in the region of the longitudinal center (i.e. in the middle of the "saddleback roof") of the inboard supporting wall, in the directions of both the upper and the lower supporting walls. This enables a configuration of the inboard supporting wall such that, that in the region of its longitudinal center it forms a neutral fibre, further with an increase in the wall thickness of the inboard supporting wall both in the direction of the upper supporting wall and in the direction of the lower supporting wall—thus taking into account the load collective loading the rear swinging fork.

To take into account this aspect, it is also provided for in a further aspect of the apparatus that the supporting arm in transition portions between the inboard supporting wall and the upper and lower supporting wall has a wall thickness which is thicker than in the portions of the supporting walls adjoining the transition portions. This further enhances the flexural rigidity of the supporting arms, as this creates accumulation of the material used to cast the rear swinging fork at locations where the collective loads on the rear swinging fork can overlap: namely, bending stresses resulting from the vertical forces, and bending stresses resulting from cornering forces building up in the rear wheel and thus loading the rear swinging fork with side forces which tend to bend the rear swinging fork sideways (out of a vertical oriented longitudinal center plane of the rear swinging fork to the side).

In this arrangement, the lateral rigidity of the rear swinging fork is dictated by the upper and lower supporting walls of the supporting arms. In the transition portion between each inboard supporting wall and its associated upper and lower supporting walls, the bending stresses can overlap due to the vertical forces and side forces. By configuring the supporting arm in accordance with the invention, in the portion between the inboard supporting wall and the upper and lower supporting wall, with a wall thickness which is thicker than in the portions of the supporting walls adjoining the transition portion, there is achieved a configuration of the rear swinging fork in keeping with the load collective. Also, by the reduced wall thickness of the supporting walls adjoining the transition portion, a configuration is achieved which satisfies the requirement for weight savings in the rear swinging fork.

It is also provided that the wall thicknesses of the upper and lower supporting walls are reduced from the portions adjoining the transition portion between the upper and lower supporting wall and the inboard supporting wall to the outboard portions of the upper and lower supporting walls (as viewed in the longitudinal direction of the rear swinging fork). This takes into account a determination that, because of the transition portion between the inboard supporting wall and the upper as well as the lower supporting wall being configured with a thicker wall thickness, it is no longer necessary to maintain a uniform wall thickness in the upper and lower supporting walls; rather, in the disclosed apparatus, it is preferred to allow the wall thicknesses of the upper and lower supporting walls to decrease for a further reduction in weight in the outboard portions of the upper and lower supporting walls (i.e., in the region spaced away from the vertical oriented longitudinal center plane of the rear swinging fork). A savings in weight is thus achieved.

It also is disclosed that each upper and lower supporting wall features a stiffening rib extending substantially from the mounting portion substantially to the wheel mounting portion. This results in both the upper and the lower supporting walls featuring an upper and lower stiffening rib extending in the longitudinal direction of the supporting arm, extending substantially from the mounting portion (i.e. the fulcrum of the fork mount) substantially up to the wheel mounting portion. By this arrangement, the stiffening rib can be arranged at the portions of the upper and lower supporting walls, facing the inboard supporting wall outside of the cavity and featuring along its longitudinal extent a portion of increasing thickness and a portion of diminishing thickness.

Each stiffening rib of the upper and lower supporting walls thus runs outside of the cavity of the supporting arm formed by the supporting walls. Such stiffening ribs can thus be configured so that their respective thicknesses increase continually (or discontinually) from the mounting portion of the supporting arm in the direction of the wheel mount, and then re-diminishing (decreasing) in thickness in the direction of the wheel mount. The stiffening ribs so configured on the upper and lower supporting walls serve in this arrangement to boost the lateral rigidity of the apparatus, and helps prevent lateral buckling of the upper and lower supporting wall of each supporting arm.

Another disclosed aspect of the apparatus is that at least a portion of the inboard supporting wall preferably extends between the two supporting arms along a portion of the cross member facing the mounts, and forms or defines a front wall of the cross member. The inboard supporting wall thus provides, in the portion between the fork bearing mounts of the supporting arms and cross member, a flexurally rigid configuration.

In a similar manner, a flexurally rigid configuration of the rear swinging fork, in the portion between the cross member and the wheel mount of the supporting arms, at least a portion of the inboard supporting wall extends between the two supporting arms along at least a portion of the cross member located opposite the mounts, to form or define a rear wall of the cross member.

As previously explained, the supporting arms have in the portion between the supporting walls a cavity ensuring that the dead weight of the rear swinging fork can be minimized. Moreover, stiffening ribs preferably are provided in the cavity of each supporting arm to further enhance the rigidity, both longitudinally and laterally, of the supporting arms and thus of the rear swinging fork.

It is thus provided that the supporting arms each has in its cavity between the mount and the cross member at least one first stiffening rib extending from the upper supporting wall to the lower supporting wall. This stiffening rib prevents buckling of the upper supporting wall in the portion between the mount and the cross member (which could otherwise result in corrugations or buckling in the upper supporting wall). Similarly, at least one second stiffening rib is provided between the mount and the cross member, extending from the upper supporting wall to the mount but without being attached to a corner portion of the cavity, but instead to a cast lug forming the mount of the supporting arm.

Also it may be provided for that each supporting arm has in its cavity, in the region or vicinity of the cross member, at least one third stiffening rib extending from the upper supporting wall to the lower supporting wall to enhance (in the region of the cross member) the torsional rigidity of the cross member and thus of the rear swinging fork. In the portion between the cross member and wheel mount, too, there is provided at least one further, i.e. a fourth stiffening rib, extending from the upper to the lower supporting wall to prevent buckling of the upper supporting wall in the portion between the cross member and the wheel mount.

Preferably further, the supporting arms in their cavities have in their portions between the cross member and wheel mount an additional, fifth stiffening rib extending from the upper supporting wall to a tapped cast lug. When the disclosed rear swinging fork is put to use on a motorcycle having no central main stand, an external fitting stand engaging the wheel mounting portion of the rear swinging fork is often employed. This external fitting stand can be bolted to the rear swinging fork when, for example, changing the rear wheel or drive chain of the motorcycle, a bolt of the external fitting stand being screwed into the tapping of the cast lug for this purpose. The fifth stiffening rib extends from the upper supporting wall to the cast lug which to advantage is directly attached to the lower supporting wall.

Preferably, each of the stiffening ribs in the portion between the mount and the cross member as well as between the cross member and the wheel mount is upswept toward the inboard supporting wall, and features portions differing in width along its longitudinal extent.

Thus the width of each stiffening rib may feature in the portion of its longitudinal extent from its first attachment point to its second attachment point (e.g., between the upper supporting wall and the lower supporting wall) a reversing point, such that the width first decreases (for instance from the upper supporting wall in the direction of the lower supporting wall) and to then increase again (i.e., with a minimum width at the reversing point), thereby to reduce the weight of the rear swinging fork.

To further enhance the torsional rigidity of the rear swinging fork, it preferably is provided that the supporting arms feature, in the portion of the cross member, a criss-cross arrangement of stiffening ribs extending from the upper supporting wall to the lower supporting wall, and in which a criss-cross portion of the stiffening ribs is displaced or extends inboard (in the direction of a longitudinal center plane of the rear swinging fork). This offers the advantages that, on the one hand, the criss-cross arrangement of the stiffening ribs significantly boosts the torsional rigidity of the cross member and thus of the rear swinging fork, and on another, that displacing the criss-cross portion of the stiffening ribs in the direction of the longitudinal center plane of the rear swinging fork inboard promotes the object of reducing the weight of the rear swinging fork. The weight reduction is realized by avoiding an accumulation of material used in forming the rear swinging fork in a portion which is only of minor importance in further enhancing the torsional rigidity.

To further enhance the torsional rigidity of the rear swinging fork, it preferably is provided that the cross member features a cross member wall separating the cavity of the two supporting arms and oriented in the longitudinal direction of the rear swinging fork to which the criss-cross arrangement of the stiffening ribs is attached. This cross member wall thus extends in the longitudinal direction of the rear swinging fork over the cross member as a whole in connecting the front wall to the rear wall of the cross member. The cross member wall serves as a surface for linking the criss-cross arrangement of stiffening ribs of the cross member.

In this arrangement, the cross member wall in another aspect of the apparatus can extend from an upper cross member covering wall connecting the upper supporting wall to the two supporting arms down to a lower cross member covering wall connecting the lower supporting wall of the two supporting arms. This further enhances the torsional rigidity of the cross member and thus of the rear swinging fork in accordance with the invention.

Disposed at the lower cross member covering wall in this embodiment there preferably is provided a bifurcated mount for a spring damper mechanism; the spring damper mechanism includes a spring damper element, and/or a lever cooperating with a spring damper element, supporting the latter at the rear swinging fork. The vertical forces emanating from the rear wheel of the motorcycle are thus introduced via the bifurcated mount into the rear swinging fork in accordance with the invention.

In yet another aspect of the disclosed apparatus, the rear swinging fork preferably is fabricated from an aluminum alloy, most preferably AlSi$_9$MgMn, which is of advantage due to its high strength in combination with high ultimate elongations.

BRIEF DESCRIPTION OF THE DRAWINGS

The accompanying drawings, which are incorporated into and form a part of the specification, are for the purpose of illustrating a preferred embodiment of the invention, and are no to be construed as limiting the invention. In the drawings.

DESCRIPTION OF THE PREFERRED EMBODIMENTS

Best Mode for Practicing the Invention

Figure 1:
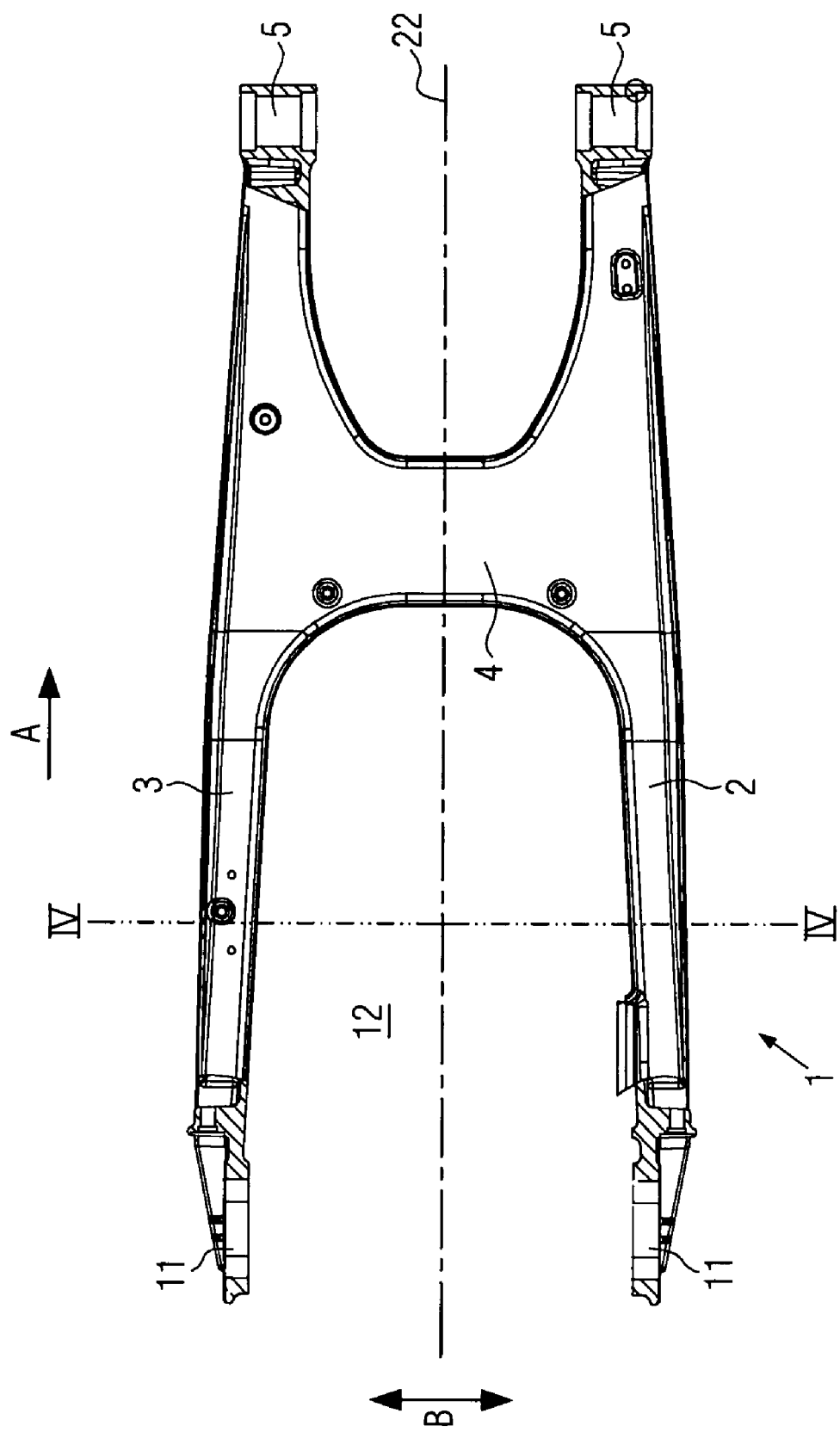
FIG. 1 is a partly sectioned top-down view of one embodiment of the rear swinging fork in accordance with the invention.

Referring now to FIG. 1 there is illustrated a partly sectioned top-down view of one embodiment of the rear swinging fork in accordance with this disclosure.

As is immediately apparent, the rear swinging fork 1 is configured in an overall H-shape, with a first supporting arm 2, a second supporting arm 3 and a cross member 4. The two supporting arms 2, 3 each feature at their respective front ends, in the direction of the directional arrow A, a mount 5 to which the rear swinging fork 1 can be pivotally mounted on the motorcycle frame (not shown). For this purpose the mounts 5 can incorporate conventional bushings or needle bearings through which a fork bearing spindle passes.

The rear swinging fork 1 features, in the direction opposite that of the directional arrow A, a configuration becoming wider overall, starting from the mounts 5 and ending in a wheel mount 11 at the two supporting arms 2, 3; there thus provided of an oblong aperture for receiving a wheel axle of the rear wheel (not shown) of the motorcycle longitudinally shiftable by a certain distance.

As directly evident from the figures, the space between the cross member 4 and the mounts 5 is configured to be open, as the cross member 4 is the only cross member of the rear swinging fork 1; no other cross member is provided between the mounts 5.

Figure 2:
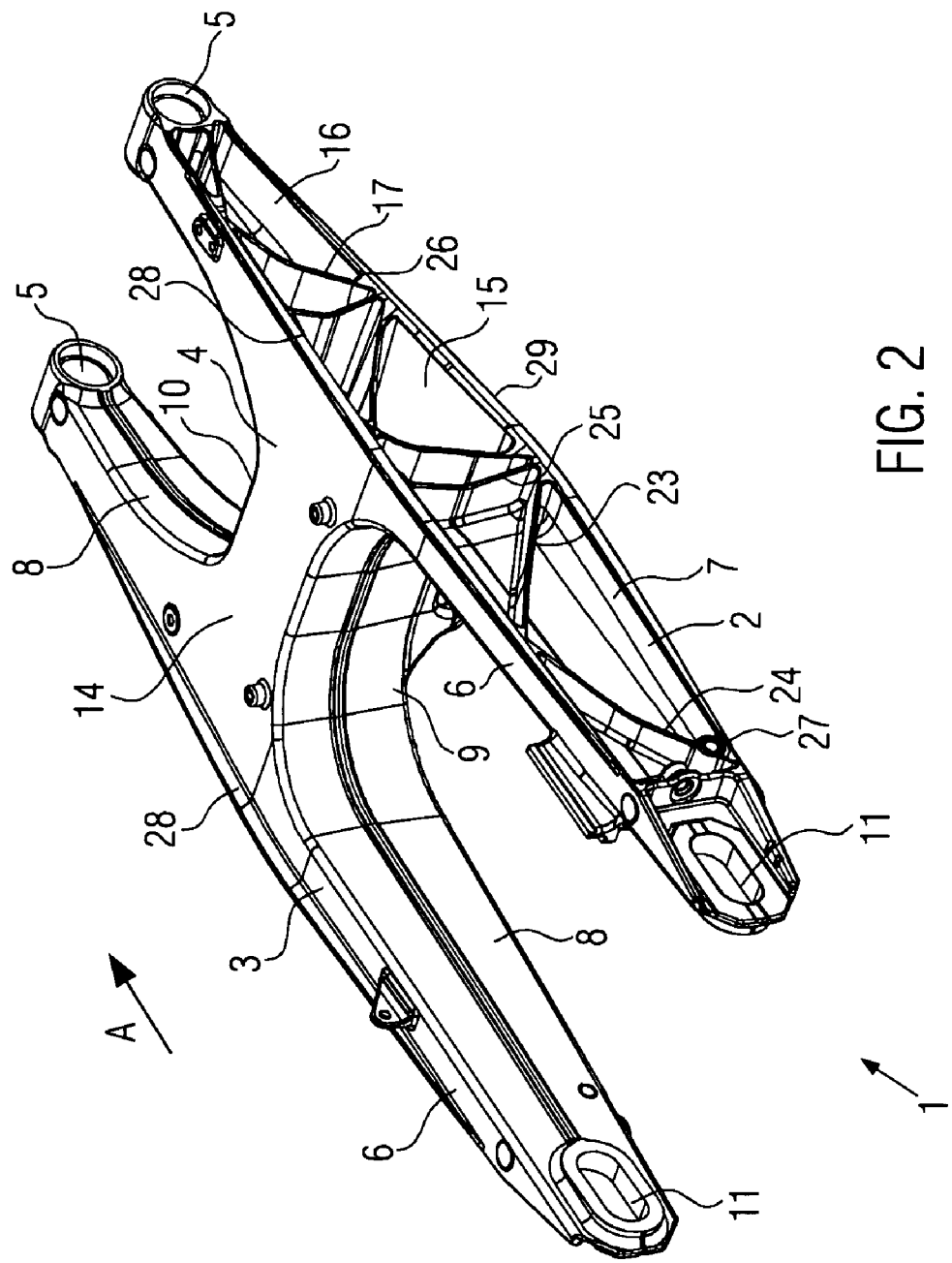
FIG. 2 is a view in perspective of the rear swinging fork.

Referring now to FIG. 2 of the drawings, there is illustrated a view in perspective of the rear swinging fork 1 with the two supporting arms 2, 3 and the cross member 4. The two supporting arms 2, 3 extend in the longitudinal direction of the rear swinging fork 1, and each features an upper supporting wall 6 and a lower supporting wall 7. The supporting arms 2, 3 also each include, longitudinally in the direction of the arrow A, and connecting the upper supporting wall 6 and lower supporting wall 7, a side inboard supporting wall 8. Inboard supporting wall is responsible particularly for the longitudinal or flexural rigidity of the rear swinging fork 1.

Some or all the inboard supporting wall 8 extends between the two supporting arms 2, 3 at the portion of the cross member 4 opposite (away from) the mounts 5, to define or form the rear wall 9 of the cross member 4. In a similar way, some or all the inboard supporting wall 8 also extends between the two supporting arms 2, 3 along a portion of the cross member 4 facing the mounts 5, where it forms a front wall 10 of the cross member 4.

Quite generally, the inboard supporting wall 8 has, starting from the wheel mount 11 and proceeding in the direction of the directional arrow A, a straight elongated configuration, which then translates in the region of the rear wall 9 into a curved configuration having a radius, to then translate again in the region of each supporting arms 2, 3 back into a elongated, straight configuration up to the wheel mounts 11.

In a similar way, the inboard supporting wall 8 translates in the portion between the mounts 5 and the front wall 10 of the cross member 4 from a linear configuration into a curved configuration having a radius (as evident from FIG. 2) in the region of the second supporting arm 3 to then, after having formed the front wall 10, again extend in a closed curve profile up to the mounts 5 of the supporting arms.

The upper supporting wall 6 of each supporting arm 2, 3 and the lower supporting wall 7 of each supporting arm 2, 3 substantially contributes towards enhancing the lateral rigidity of the rear swinging fork when bending stress occurs in the direction of the double arrow B (FIG. 1) due to, for instance, cornering forces of the rear wheel guided in the interspace 12 between the two supporting arms 2, 3. Also, the inboard supporting wall 8 of each supporting arm 3 substantially contributes towards the bending and lateral rigidity of the rear swinging fork 1 when loaded in the direction of the double arrow C (FIG. 3), when vertical forces are introduced into the rear swinging fork 1 via the wheel mounts 11. These latter forces are supported via a strut or spring damper element (not shown) supported by the bifurcated mount 13 relative to the motorcycle frame.

When, for example, a motorcycle equipped with the present rear swinging fork impacts the road surface by the rear wheel after a leap, heavy tensile loading stresses result in the inboard supporting wall 8 in the region of the lower supporting wall 7, (i.e. a region in which known rear swinging forks have a minimum wall thickness in the yaw direction of the fork).

In the present apparatus, the cross member 4 has a cross member covering wall 14 connecting each upper supporting wall 6 of the first supporting arm 2 and second supporting arm 3 and a cross member covering wall 15 connecting each lower supporting wall 7 of the first supporting arm 2 and second supporting arm 3 (FIG. 2). The upper supporting wall 6, lower supporting wall 7 and inboard supporting wall 8 of each of the two supporting arms 2 and 3 form between them a cavity 16 extending along each supporting arm 2, 3 along the axial length between each mount 5 and each wheel mount 11. Situated in the cavity 16 between the mount 5 and cross member 4 of each supporting arm 2, 3 is a first stiffening rib 17 downswept from the upper supporting wall 6 to the lower supporting wall 7 (i.e. in the embodiment as shown from the middle portion of the space of the supporting arms 2, 3 formed between the mount 5 and the cross member 4 in such a direction that the first stiffening rib 17 is subjected to tensile or compression loading depending on the vertical acting force engaging the wheel mount 11).

In a similar way, a second stiffening rib 18 (FIG. 3) is disposed in the space between the mount 5 and cross member 4, in each supporting arm 2, 3. The second stiffening rib 18 extends from where the first stiffening rib 17 joins the upper supporting wall 6 in the direction of the mounts 5, and is directed forward to join at a cast lug 19 forming the mount 5 at the supporting arm 2, 3. In this arrangement, the first stiffening rib 17 prevents buckling of the upper supporting wall 6 in the portion between the mount 5 and the cross member 4 which otherwise would result in corrugation of the upper supporting wall 6. Similarly, the second stiffening rib 18 contributes towards enhancing the flexural rigidity or transverse rigidity and longitudinal rigidity of the rear swinging fork 1, by distributing the stress in the material in the region of the mounting portion 5.

In the cavity 16 of the supporting arms 2, 3, in the region of the cross member 4 as shown, are two third stiffening ribs 20 downswept from the upper supporting wall 6 to the lower supporting wall 7. This pair of third stiffening ribs 20 enhance the torsional rigidity of the cross member 4, and thus of the rear swinging fork 1. The criss-cross arrangement of the third stiffening ribs 20, as illustrated, has a central criss-cross portion 21 located to extend inwardly, that is, inboard in the direction of a longitudinal imaginary center plane 22 (FIG. 1) of the rear swinging fork 1. This criss-cross arrangement of third stiffening ribs 20 significantly increases the torsional rigidity of the cross member 4, and due to the criss-cross portion 21 of the stiffening ribs 20 extending inboard in the direction towards the longitudinal center plane 22 of the rear swinging fork 1, the resulting material savings promotes the object of reducing the weight of the rear swinging fork 1.

In their portions between the cross member 4 and wheel mount 11, in the cavity 16 of the embodiment as shown, the respective supporting arms 2, 3 each features a fourth stiffening rib 23 and a fifth stiffening rib 24. The fourth stiffening rib 23 in this arrangement is slantingly downswept from the upper supporting wall 6 to the lower supporting wall 7, to join the lower supporting wall 7 at a surface in the region of one of the third stiffening ribs 20, and also in the vicinity of a downswept sixth stiffening rib 25. Similarly, there preferably is disposed between the first stiffening rib 17 and one of the pair of crossed third stiffening ribs 20 in the criss-cross arrangement an additional further, seventh stiffening rib 26. The seventh stiffening rib 26 is arranged between the upper supporting wall 6 and the lower supporting wall 7 and, like the sixth stiffening rib 25, is downswept substantially vertical.

The fifth stiffening rib 24 in this embodiment is downswept at an angle from the upper supporting wall 6, from the mounting portion of the fourth stiffening rib 23 at the upper supporting wall 6, to the lower supporting wall 7, i.e. down to the cast lug 27 portion. The cast lug 27 has a tapping with a female thread for releasably securing a fitting stand via a bolt when, for example, changing the rear wheel of the motorcycle and the motorcycle has no central main stand.

As seen in FIG. 2, the width of each stiffening rib changes lengthwise from its first jointing point to its second jointing point, e.g., for of the upper supporting wall 6 and lower supporting wall 7 respectively, such that the width is first reduced downswept from the upper supporting wall 6 to the lower supporting wall 7, to then increase again from an intermediate portion of minimum width on to the lower supporting wall 7. This configuration promotes the object of reducing the weight of the rear swinging fork.

Figure 3:
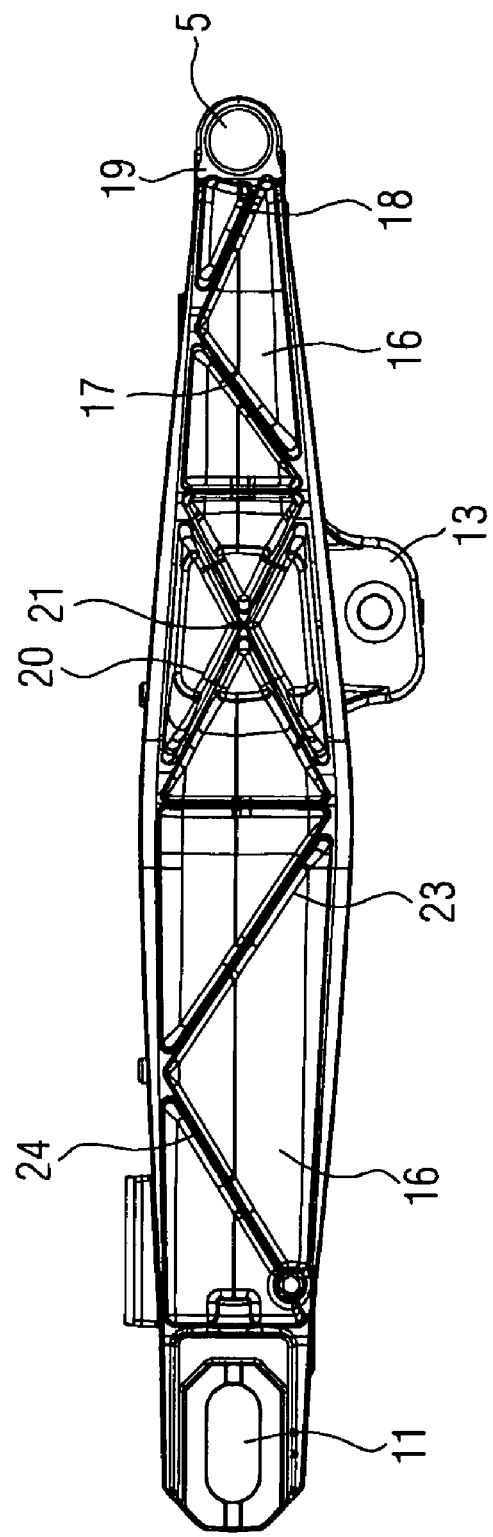
FIG. 3 is a side view of the rear swinging fork.

Referring to FIG. 2 and FIG. 3 of the drawings, both supporting arms 2 and 3 manifest, at each upper supporting wall 6 in the outboard portion (spaced away from the longitudinal center plane 22) a first longitudinal stiffening rib 28, and, at the lower supporting wall 7, a second longitudinal stiffening rib 29. The upper supporting wall 6 and the lower supporting wall 7 counteract lateral buckling of the central stand formed by the inboard supporting wall 8, each of the longitudinal stiffening ribs 28, 29 prevents lateral buckling of the upper and lower supporting wall 6, 7 in serving to avoid stress peaks.

In addition, FIG. 2 shows how longitudinal stiffening ribs 28, 29 vary in vertical thickness in the direction of the directional arrow A. In the embodiment as shown, the thickness first continuously increases from the thickness of the longitudinal stiffening ribs 28, 29 to then gradually become less in thickness in the direction of the mount 5. This is why each longitudinal stiffening rib 28 and 29 runs outside of the cavity 16 of the supporting arms 2, 3 formed by the supporting walls 6, 7, 8; and the longitudinal stiffening ribs contribute to the lateral rigidity of the rear swinging fork 1, and prevent lateral buckling of the upper and lower supporting wall 6, 7 of each supporting arm 2, 3.

Figure 4:
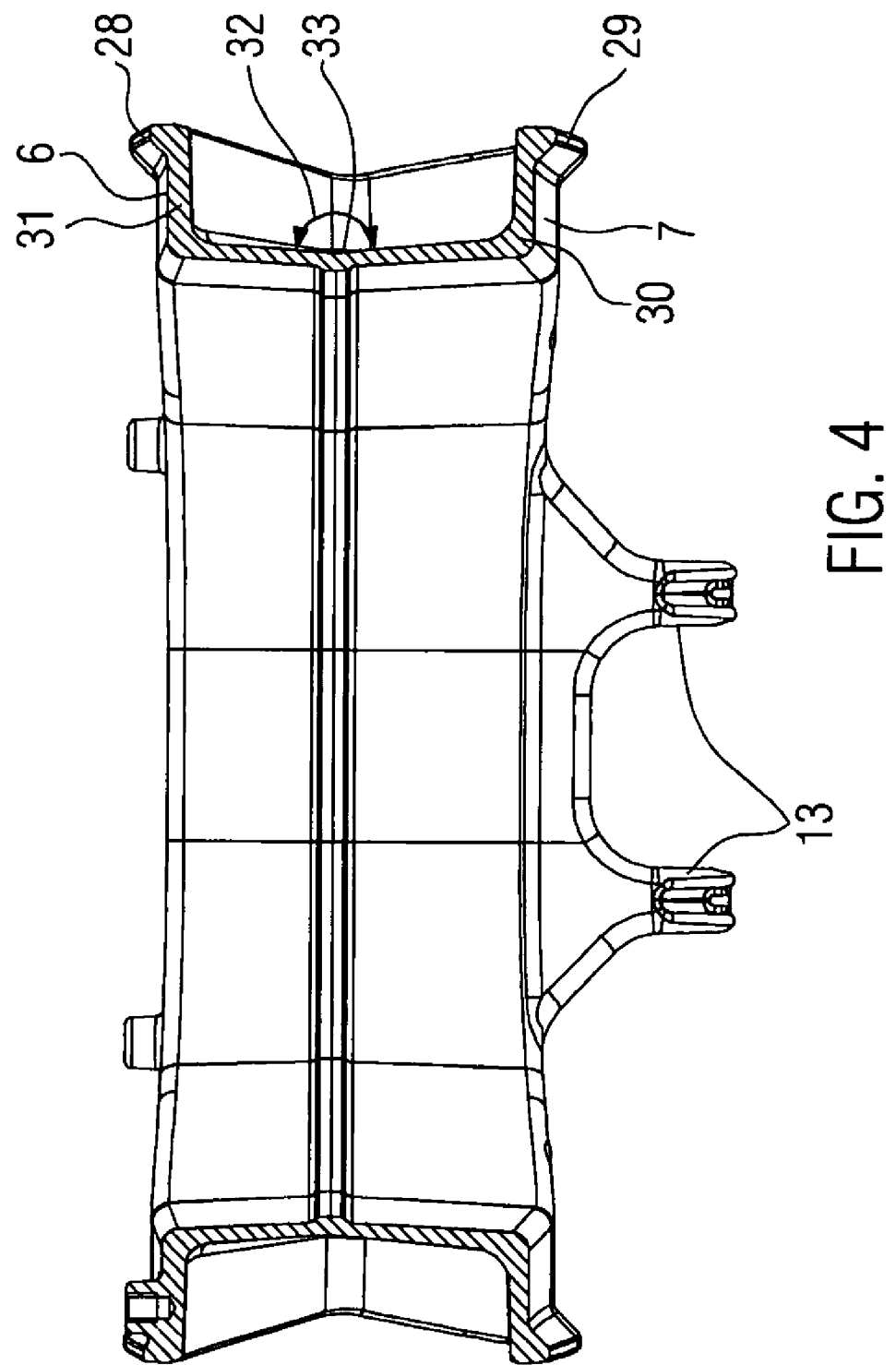
FIG. 4 is a cross-section view, taken in section plane IV-IV of FIG. 1, of the rear swinging fork in a section transverse to the longitudinal direction of the rear swinging fork through the two supporting arms.

Referring now to FIG. 4 of the drawings, there is provided a view in the direction of the arrow A as shown in FIG. 1, i.e. as viewed in the section plane IV-IV in FIG. 1. At the bifurcated mount 13 a strut (not shown) of the motorcycle can be pivotally mounted. The inboard supporting wall 8 of the supporting arm 2 on the right is connected in one piece to each upper supporting wall 6 and lower supporting wall 7. In this arrangement, the supporting arm 2 features, in a lower transition portion 30 between the lower supporting wall 7 and inboard supporting wall 8 and in an upper transition portion 31 between the upper supporting wall 6 and inboard supporting wall 8, a wall thickness in each case which is thicker than in the portions of the supporting walls 6, 7, 8 adjoining the transition portions 30 and 31.

These thicker transition portions accommodate the property of the fork that in the transition portions 30 and 31, stresses stemming from the bending load of the rear swinging fork 1 due to vertical forces, and a bending load of the rear swinging fork 1 due to side forces can overlap. The configuration thus counteracts an elevated stress concentration in each transition portion 30, 31. Starting from each transition portion 30 and 31, the wall thickness of the upper supporting wall 6 and the wall thickness of the lower supporting wall 7 are reduced outwardly in the direction of the first longitudinal stiffening ribs 28 and of the second longitudinal stiffening ribs 29, to take into account the object of reducing the weight of the rear swinging fork 1.

The inboard supporting wall 8 comprises a saddle roof configuration with an internal angle 32 which in the embodiment as shown is 174 degrees as having been found to be of advantage in tooling.

As is evident from the drawings, the wall thickness of the inboard supporting wall 8 linearly increases from a neutral fibre in the region of the saddle roof center 33, both in the direction of the upper supporting wall 6 and in the direction of the lower supporting wall 7. This is in keeping with the longitudinal center and a balanced stress distribution in each supporting arm 2, 3. The longitudinal stiffening ribs 28, 29 define a roughly triangular configuration to prevent lateral buckling of the upper supporting wall 6 and lower supporting wall 7.

Figure 5:
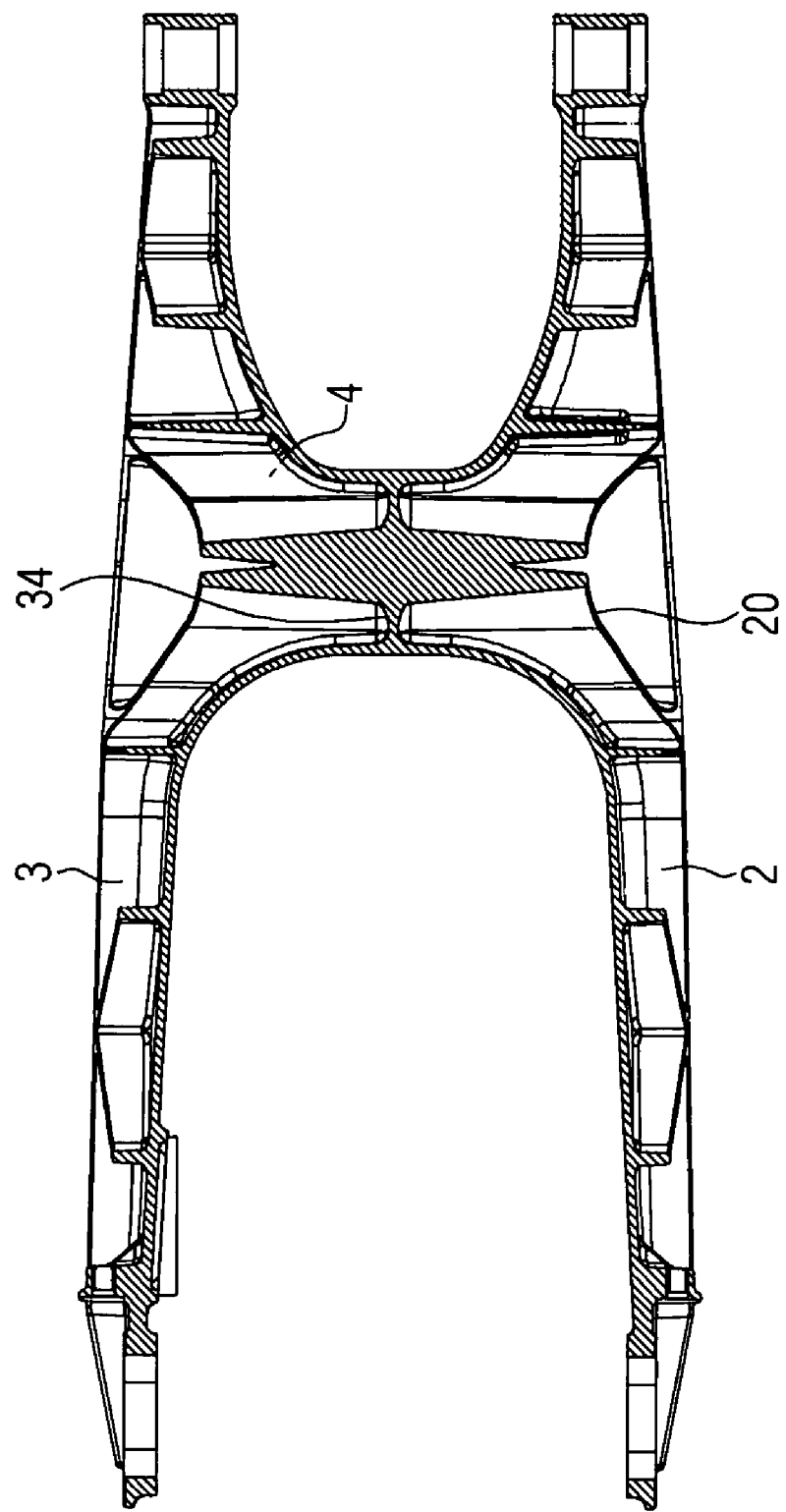
FIG. 5 is a top-down view of the rear swinging fork in section taken in a plane parallel to the plane of the drawing.

Referring now to FIG. 5, there is illustrated a section view through the rear swinging fork 1, showing how extending between the supporting arms 2 and 3 is the cross member 4 enhancing the torsional rigidity of the rear swinging fork 1. So to further increase the torsional rigidity of the fork, there is provided in the region of the cavity 16 in the portion of the cross member 4, the criss-cross arrangement of third stiffening ribs 20 which in the region of the longitudinal center plane 22 of the rear swinging fork 1 connect with or attach to a cross member wall 34. The cross member wall 34 is downswept from the upper cross member covering wall 14 to the lower cross member covering wall 15, in enhancing the torsional rigidity of the cross member 4 and thus of the rear swinging fork 1.

The invention thus defines a one-piece die-cast rear swinging fork for a motorcycle featuring high rigidity both longitudinal and transversely in handling torsional forces whilst being a low-weight structure with a deadweight of just 4.1 kg.

As regards features of the invention not detailed hitherto express reference is made to the claims and the drawing.

LIST OF REFERENCE NUMERALS 1 rear swinging fork
2 first supporting arm
3 second supporting arm
4 cross member
5 mount
6 upper supporting wall
7 lower supporting wall
8 inboard supporting wall
9 rear wall
10 front wall
11 wheel mount
12 interspace
13 bifurcated mount
14 upper cross member covering wall
15 lower cross member covering wall
16 cavity
17 first stiffening rib
18 second stiffening rib
19 cast lug
20 third stiffening rib
21 criss-cross arrangement
22 longitudinal center plane
23 fourth stiffening rib
24 fifth stiffening rib
25 sixth stiffening rib
26 seventh stiffening rib
27 cast lug
28 first longitudinal stiffening rib
29 second longitudinal stiffening rib
30 lower transition portion
31 upper transition portion
32 internal angle
33 saddle roof center
34 cross member wall
A arrow
B double arrow
C double arrow Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all patents and publications cited above are hereby incorporated by reference.

What is claimed is:

1. A rear swinging fork (1) for a motorcycle frame, comprising:
    two longitudinal extending supporting arms (2, 3) each supporting arm comprising in a section transverse to the longitudinal direction of the rear swinging fork (1) three supporting walls (6, 7, 8), the supporting walls being an upper supporting wall (6), a lower supporting wall (7), and an inboard supporting wall (8) connecting the upper (6) and lower supporting walls (7);
    a transverse cross member (4) connecting the supporting arms (2, 3);
wherein each of the supporting arms (2, 3) has a pivot mount (5) for pivotal connection of the rear swinging fork (1) to the motorcycle frame; and
    in a region of each of the ends of the supporting arms, opposite the pivot mounts (5), a wheel mount (11) for the rear wheel of a motorcycle;
wherein:
    the rear swinging fork is die cast as one piece;
    portions of the supporting arms between the cross member (4) and the pivot mounts (5) are configured open, and a portion of the inboard supporting wall (8) also extends integrally between the two supporting arms (2, 3) along a portion of the cross member (4) facing the pivot mounts (5), where it forms a front wall 10 of the cross member (4), there being no other cross member provided between the pivot mounts (5); and
    the supporting walls form there between a laterally outwardly open longitudinal cavity.

2. The rear swinging fork as set forth in claim 1, characterized in that the supporting arms are configured to define a C-shape in transverse cross-section.

3. The rear swinging fork as set forth in claim 1, characterized in that the inboard supporting wall (8) comprises a saddle roof configuration subtending an internal angle (32) in the range of from approximately 160 degrees to approximately 180 degrees.

4. The rear swinging fork as set forth in claim 1, characterized in that a wall thickness of the inboard supporting wall (8) increases, in the directions toward the upper supporting wall (6) and toward the lower supporting wall (7), from an initial wall thickness substantially in the region of the longitudinal center (33) of the inboard supporting wall (8).

5. The rear swinging fork as set forth in claim 1, characterized in that each of the supporting arms (2, 3) comprises two transition portions (30, 31), between the inboard supporting wall (8) and each of the upper supporting wall (6) and the lower supporting wall (7) respectively, the transition portions having a wall thickness greater than thicknesses of the supporting walls (6, 7, 8) adjoining the transition portions.

6. The rear swinging fork as set forth in claim 5, characterized in that the respective wall thicknesses of the upper (6) and lower supporting walls (7) decrease, from portions of the supporting walls adjoining the transition portions (30, 31), in directions away from the inboard supporting wall (8) and toward outboard portions of the upper (6) and lower (7) supporting walls, as viewed in the longitudinal direction of the rear swinging fork (1).

7. The rear swinging fork as set forth in claim 1, characterized in that the swinging fork has a longitudinal center plane (22) and each upper supporting wall (6) has a first longitudinal stiffening rib (28) projecting upward from an outboard portion thereof spaced away from the longitudinal center plane, and each lower supporting wall (7) has a second longitudinal stiffening rib projecting downward from an outboard portion thereof, the stiffening ribs (28, 29) extending substantially from the respective pivot mounts (5) substantially to the wheel mounts (11).

8. The rear swinging fork as set forth in claim 7, characterized in that the first and second longitudinal stiffening ribs (28, 29) are disposed outside the cavity (16) at outboard portions of the upper sporting wall (6) and lower supporting wall (7), respectively, and wherein each of the stiffening ribs (28, 29) comprises along its longitudinal extent a portion of increasing thickness and a portion of diminishing thickness.

9. The rear swinging fork as set forth in claim 1, characterized in that a portion of each inboard supporting wall (8) extends between the two supporting arms (2, 3) along at least a portion of the cross member (4) located oppositely away from the pivot mounts (5), and defines a rear wall of the cross member (4).

10. The rear swinging fork as set forth in claim 1, characterized in that each supporting arm (2, 3) comprises, in the cavity (16) between the pivot mounts (5) and the cross member (4), at least one first stiffening rib (17) extending from the upper supporting wall (6) to the lower supporting wall (7).

11. The rear swinging fork as set forth in claim 10 further comprising, between the pivot mount (5) and the cross member (4) in each supporting arm, at least one second stiffening rib (18) extending from the upper supporting wall (6) to the pivot mount (5).

12. The rear swinging fork as set forth in claim 11 further comprising, in the cavity (16) of each supporting arm in the region of the cross member (4), at least one third stiffening rib (20) extending from the upper supporting wall (6) to the lower supporting wall (7).

13. The rear swinging fork as set forth claim 12 further comprising, in each supporting arm between the mount (11) and the cross member (4), at least one fourth stiffening rib (23) extending from the upper (6) to the lower supporting wall (7).

14. The rear swinging fork as set forth in claim 13 further comprising, in the cavity of each supporting arm between the cross member (4) and the wheel mount (11), at least one fifth stiffening rib (24) extending from the upper supporting wall (6) to a tapped cast lug (27).

15. The rear swinging fork as set forth in claim 14, characterized in that each of the stiffening ribs (17, 18, 20, 23, 24) extends to the inboard supporting wall (8) respectively and varies in width along its longitudinal extent.

16. The rear swinging fork as set forth in claim 1 further comprising, in the cavity of each supporting arm at the cross member (4), a criss-cross arrangement of two stiffening ribs (20) extending from the upper supporting wall (6) to the lower supporting wall (7), wherein a criss-cross portion (21) of the criss-cross arrangement of stiffening ribs extends inboard toward a longitudinal center plane (22) of the rear swinging fork (1).

17. The rear swinging fork as set forth in claim 16, further comprising in the cross member (4) a cross member wall (34), oriented in the longitudinal direction of the rear swinging fork (1) and separating the cavities (16) of the supporting arms (2, 3), wherein the cross member wall (34) is attached to the criss-cross arrangement of stiffening ribs (20).

18. The rear swinging fork as set forth in claim 17, characterized in that the cross member (4) comprises:
an upper cross member covering wall (14) connecting the upper supporting wall (6) of the two supporting arms (2, 3); and
a lower cross member covering wall (15) connecting the lower supporting wall (7) of the two supporting arms (2, 3); and
wherein the cross member wall (34) is downswept from the upper cross member covering wall (14) to the lower cross member covering wall (15).

19. The rear swinging fork as set forth in claim 18, further comprising, at the lower cross member covering wall (15), a bifurcated mount (13) for a spring damper mechanism.

20. The rear swinging fork as set forth in claim 1, characterized in that the rear swinging fork (1) comprises an aluminum alloy AlSi$_9$MgMn.

21. A rear swinging fork (1) for a motorcycle frame, comprising:
two longitudinal extending supporting arms (2, 3) each having three supporting walls (6, 7, 8); and
a transverse cross member (4) connecting the supporting arms (2, 3);
wherein each of the supporting arms (2, 3) has a mount (5) for pivotal connection of the rear swinging fork (1) on the motorcycle frame; and
in regions of each of the ends of the supporting arms, opposite the mounts (5), a wheel mount (11) for the rear wheel of a motorcycle;
wherein the rear swinging fork is die cast as one piece, and portions of the supporting arms between the cross member (4) and the mounts (5) are configured open, and the supporting arms (2, 3) each features in a section transverse to the longitudinal direction of the rear swinging fork (1) an upper supporting wall (6), a lower supporting wall (7), and an inboard supporting wall (8) connecting the upper (6) and lower supporting wall (7), the supporting walls forming a laterally outwardly open longitudinal cavity there between; and
wherein further a wall thickness of the inboard supporting wall (8) increases, in the directions toward the upper supporting wall (6) and toward the lower supporting wall (7), from an initial wall thickness substantially in the region of the longitudinal center (33) of the inboard supporting wall (8).

* * * * *